United States Patent [19]

Collins et al.

[11] Patent Number: 4,998,119
[45] Date of Patent: Mar. 5, 1991

[54] MULTIPLEXED LIGHT EMITTING DIODE PRINTHEAD

[76] Inventors: William D. Collins, 3435 Kaylene Dr.; Steven Paolini, 925 Tybalt Dr., both of San Jose, Calif. 95127; John J. Uebbing, 665 Towle, Palo Alto, Calif. 94306

[21] Appl. No.: 451,319

[22] Filed: Dec. 15, 1989

[51] Int. Cl.$^5$ .......................... G01D 15/14; B41J 2/45
[52] U.S. Cl. ................... 346/107 R; 346/154; 346/160
[58] Field of Search ............... 346/107 R, 108, 160, 346/154

[56] References Cited

U.S. PATENT DOCUMENTS 4,427,275  1/1984  Stalzer ........................ 346/107 R Primary Examiner—Bruce A. Reynolds
Assistant Examiner—Scott A. Rogers

[57] ABSTRACT

A light emitting diode printhead has a row of LED dice, with each die having one or more rows of LEDs. The LED die substrate forms a common cathode for the LEDs on that die. There is a time multiplex driver for a plurality of dice comprising a plurality of current sources. Each current source comprises a current driver FET and a data FET in series. Each data FET is connected in parallel to the anodes of corresponding LEDs on all of the dice. Switches selectively connect the substrate of each die to ground. A latching shift register is used for applying data for a selected die to the data FETs. The register is divided into the same number of blocks as the number of dice, and each block has the same number of bits as the LEDs on a die. At the same time a block of data for a selected die is connected to the data FETs, the substrate of the selected die is connected to ground, thereby enabling only the light emitting diodes on the selected die.

21 Claims, 1 Drawing Sheet

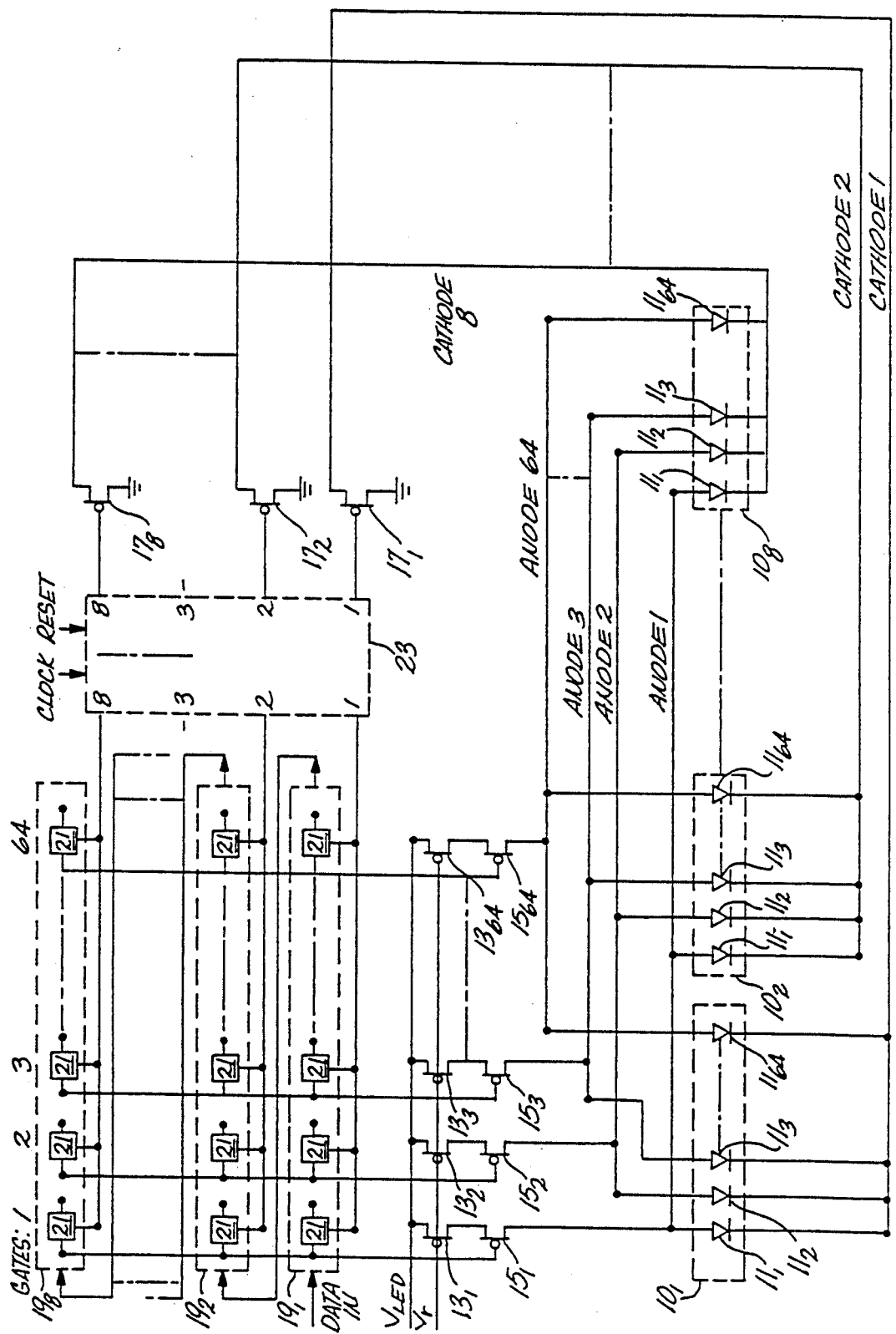

MULTIPLEXED LIGHT EMITTING DIODE PRINTHEAD

BACKGROUND OF THE INVENTION

It has become desirable to employ non-impact electro-photographic printers for text and graphics. In such a printer, an electrostatic charge is formed on a photoreceptive surface of a moving drum or belt, and selected areas of the surface are discharged by exposure to light. A printing toner is applied to the drum and adheres to the areas having an electrostatic charge and does not adhere to the discharged areas. This method is referred to a "writing white". The toner is then transferred to a sheet of plain paper and is heat- and/or pressure-fused to the paper. By controlling the areas on the drum illuminated and the areas not illuminated characters, lines and other images may be produced on the paper. Other types of printers may use similar exposure, such as "writing black" which is essentially the reverse of the charging and discharging just mentioned, or for exposing photographic or other photosensitive materials.

One type of nonimpact printer employs an array of light emitting diodes (commonly referred to herein as LEDs) for exposing the photoreceptive surface. A row, or several closely spaced rows, of minute LEDs are positioned near an elongated lens array so that their images are arrayed across the surface to be illuminated. As the surface moves past the line of LEDs, they are selectively activated to either emit light or not, thereby exposing or not exposing, the photoreceptive surface in a pattern corresponding to the LEDs activated.

To form good images in a black and white LED printer, it is desirable that all of the light emitting diodes produce the same light output when activated. This assures a uniform quality image all the way across a paper. On the other hand, in a grey scale printer, the light output of each LED is controlled to obtained the appropriate density of image. Preferably an adjustable constant current source for each LED junction is used to obtain a desired light output as a function of current. LEDs are switched on or off as appropriate for the data being printed. If used in a gray scale printer, the total exposure on a pixel by an LED depends on the time interval when it is turned on and on the current through the LED. Data for driving the individual LEDs across a printhead is, therefore, often in the form of pulse width modulation, but may also be in the form of current modulation.

Light emitting diodes for print heads are formed on wafers of gallium arsenide or the like, suitably doped to conduct current and emit light. Long arrays of LEDs are formed on a wafer which is cut into separated dice, each having an array of LEDs. A row of such dice are assembled end-to-end to form a print head array.

The LEDs are driven by current sources on integrated circuit dice. Generally speaking each integrated circuit chip has adjustable means for setting a reference voltage for the current sources. On that chip each current source comprises a field effect transistor (FET) gated by the reference voltage. To provide a constant current, each current source also includes a data FET in series with the constant current FET which, in response to a data signal at its gate, interconnects the constant current FET to an individual LED on the chip connected to that integrated circuit. Such an arrangement is described and illustrated in U.S. Pat. application Ser. No. 07/300,004, filed Jan. 19, 1989, now U.S. Pat. No. 4,864,216 issued Sept. 5, 1989, and assigned to the assignee of this application.

Thus, in a typical LED printhead there is one constant current FET and one data FET for each LED. It turns out that the cost of providing this driver circuitry is a large fraction of the total cost of an LED printhead.

It has been observed that for many printing tasks, each constant current driver for an LED is on only a small fraction of the time. This invention, therefore, employs time multiplexing so that each current source can be shared among many LEDs, thereby resulting in very substantial cost reductions for an LED printhead.

BRIEF SUMMARY OF THE INVENTION

There is, therefore, provided in practice of this invention according to a presently preferred embodiment, a multiplexed set of current sources for a light emitting diode print head having a row of LED dice, each die having a row of LEDs. Each LED die substrate forms a common cathode for the LEDs on that die. A switch selectively connects the substrate of each die to ground, and at the same time, data for a selected die is applied in parallel to the anodes of corresponding LEDs on all the dice for enabling the LEDs on only the die having its substrate switched to ground.

In a specific embodiment there is a time multiplex driver for a plurality of dice comprising a plurality of current driver FETs connected to a common gate bias voltage, and a plurality of data FETs, each data FET being in series with a current driver FET. Each data FET is connected to the anodes of the corresponding light emitting diodes on all of the dice, respectively. FET or bipolar switches selectively connect the substrate of each die to ground. Means are provided for applying data for a selected die to the anodes of corresponding LEDs on all the dies and at the same time selectively connecting the substrate of the selected die to ground. This enables only the light emitting diodes on the selected die for illuminating the desired pixels.

In an exemplary embodiment, the exposure data are loaded into a shift register and latched. A block of the latched pixel data and a block of latched current drive data for enabling the LEDs on a selected die are applied to the respective data FETs at the same time the switch for the selected die is closed. Transmission gates may be used for connecting the selected block of the shift register to the data FETs. By latching the register data, a new stream of data for the next LED die may be loaded into the register during printing.

BRIEF DESCRIPTION OF THE DRAWING

These and other features and advantages of the present invention will be appreciated as the same becomes better understood by reference to the following detailed description when considered in connection with the accompanying drawing which illustrates in block form an exemplary multiplexed driver system on an integrated circuit chip for a plurality of LEDs on a plurality of LED dice.

DETAILED DESCRIPTION

An exemplary LED print head has a row of light emitting diode (LED) dice 10 placed end-to-end to stretch across the width of a photoreceptive surface. Each die has a row of LEDs $11_n$ along its length.

For purposes of exposition of this invention it is assumed that each die has 64 LEDs along its length. Eight such LED dice $10_1, 10_2 \ldots 10_8$ are in a row for control by circuits on one integrated circuit chip. It will be recognized that this is merely exemplary and there are many other arrangements to which this invention may be applicable. For example, the odd numbered LEDs on a die may be controlled by circuits on one integrated circuit chip and the even numbered LEDs on the die may be controlled by circuits on another integrated circuit chip. Clearly, other numbers of LEDs and/or dice may be involved. The LEDs are also assumed to be on dice where the cathodes of all of the LEDs are common and separate electrical connections are made to the anodes of each LED. Other types of LEDs (e.g. AlGaAs) may have common connections for the anodes and individual connections for the cathodes. Reference to cathodes herein is a matter of convenience, and it will be understood that the reverse electrical connection is included as equivalent.

The multiplexed current supply for the LED dice is on a silicon integrated circuit chip which may be adjacent to the row of LED dice. The integrated circuit chip is not separately identified in the drawing, but includes essentially everything in the drawing except the LED dice and some connections. The integrated circuit chip may also included additional circuit features, such as a reference voltage source, data processing gates and error compensation features.

The integrated circuit includes a plurality of LED current sources corresponding to the number of LEDs on an LED die, thus, in the exemplary embodiment there are 64 current sources. Each current source comprises a p-channel output driver field effect transistor (FET) 13.

A chip reference voltage $V_r$ is connected to the gate of each of the plurality of similar p-channel output driver FETs $13_1, 13_2 \ldots 13_{64}$, which provide current for corresponding light emitting diodes $11_1, 11_2 \ldots 11_{64}$ on respective dice. By having the gates of all of the output driver FETs 13 tied together to the chip reference voltage $V_r$, the current for each driver is substantially identical. These can be thought of as current mirrors with the same current flow as in a reference constant current cell (not shown). By having independent drivers for each LED, the light output, rise time and the like is substantially identical for all of the LEDs. The current from each driver FET, and the respective rise and fall time, for each LED is substantially independent of the number of LEDs enabled.

Each of the output driver FETs 13 is in series with a p-channel data FET $15_1, 15_2 \ldots 15_{64}$. The data FETs 15 act as switches in response to presence or absence of a data signal applied to the gate of the respective data FET.

The output of each data FET is applied to the anode of the corresponding LED on each of the eight LED dice $10^1, 10^2 \ldots 10^8$. That is, the output of the first data FET is connected in parallel to the anodes of the corresponding LED's. Thus for example, the output of the first data FET $15_1$, is applied in parallel to the corresponding LED $11^1$ on each of the eight dice. Similarly the output of the second data FET $15_2$ is connected in parallel to the corresponding LED's $11_2$, on all of the eight dice, and so on across the full plurality of current sources and LEDs.

Previously, it has been the practice to connect the substrate forming a common cathode for all of the LEDs on the dice directly to ground. Control of the LEDs has been obtained by applying a data signal to the data FETs corresponding to the LEDs to be enabled. In practice of this invention, however, the LED dice 10 are isolated from ground. Instead, the substrate or cathode of each die is connected to a grounding transistor 17 (either a FET or a bipolar transistor). The substrate of cathode of the first die $10_1$, is connected to a first grounding transistor $17_1$, and so on across the row of LED dice until the substrate or cathode of the eighth die is connected to a grounding transistor $17_8$. Thus, by applying a signal to a selected grounding transistor the cathodes of all the LEDs on the respective selected die are connected to ground.

Data for switching the data FETs is loaded serially into eight shift registers 19, each register having 64 bits. The shift registers can also be considered as a 512 bit shift register divided into eight blocks of 64 bits each. When the data for 512 LEDs has been loaded into the shift register, the data are latched and the register can then be used to receive the next line of 512 bits of data. Data for each LED determines whether an LED is lighted during printing of a line.

The latched data in each bit of the register may be sampled with a transmission gate 21. The control input to all of the transmission gates in each of the eight shift registers are connected in parallel to a respective output of a decoder/counter 23. Thus, for example, all of the control inputs for the transmission gates for the first shift register $19_1$, are connected in parallel to the 1 output of the decoder/counter. Similarly, all of the control inputs for the transmission gates connected to the second shift register $19_2$, are connected in parallel to the 2 output of the decoder/counter, and so on for all eight shift registers.

Alternatively, one may sequence the data coming through DATA IN so that 64 bits for the first LED die are loaded and are then exposed while the next 64 bits for the second LED die are being loaded, etc. The data latch signals are used to increment the counter 23 and transmission gates need not be used. Other loading and reading arrangements will be apparent. For example, one may load data for dice 1, 9, 17, 25, etc. and when these dice are turned on, one may load data for dice 2, 10, 18, 26, etc. Such multiplexing arrangements can be provided in the data source circuitry.

For the illustrated embodiment where 512 bits are loaded, the output terminals of the first transmission gates in all of the eight shift registers are connected in parallel to the gate of the first data FET $15_1$. Similarly, the output terminals of all of the transmission gates for the second bit in each of the eight registers are connected in parallel to the gate of the second data FET $15_2$, and so on across the array until the last transmission gates for all the registers are connected to the last data FET $15_{64}$.

The respective outputs of the decoder/counter 23 are also applied to the gates of the cathode switching transistors 17. Thus, the 1 output of the decoder/counter is connected to the gate of the first cathode switching transistor $17_1$ which is connected to the substrate of the first LED die $10_1$. The rest of the eight outputs of the decoder/counter are similarly connected to the gates of the other cathode switching transistors 17 for selectively connecting the substrate of each die to ground.

The LEDs on a die are enabled according to the data latched in a respective shift register in response to clock counting in the decoder/counter. Thus, for example, the signal applied to the control inputs of the transmission gates in the first register $19_1$ applies the 64 signals latched in the first shift register to the 64 data FETs 15, respectively. To the extent the data commands, the data FET conducts so that current is available from the respective current source 13 to all of the corresponding LEDs on the eight dice.

None of the LEDs can conduct, however, unless the common cathode on that die is connected to ground. Therefore, the 1 output of the decoder/counter is also applied to the gate of the first cathode switching transistor $17_1$, thereby permitting the LEDs on the first die $10_1$ to conduct and illuminate the corresponding pixels. By counting across the decoder/counter each shift register and corresponding cathode switching transistor are enabled in turn for sequentially enabling the LEDs on each of the eight LED dice in turn.

An LED printhead exposes the photoreceptive surface of a drum or belt in a series of rows of dots extending across the drum. A separate line of data is used for each line of illumination by the LEDs. If desired the decoder/counter may scan all the shift registers in the time required to illuminate one line on the drum. On the other hand, it may be desirable to count two or four times across the decoder/counter during the time one line is exposed, thereby integrating the illumination of smaller areas on the moving drum in response to repeated shorter pulses of current on the LEDs. Other sequences of multiplexing may be used as well.

It will be recognized that the cathode switching transistors 17 carry appreciable current since connected in parallel to the cathodes of numerous LEDs. Thus, instead of having these on the same chip as the balance of the integrated circuit, they may preferably be located on a separate chip so that bipolar transistors or large area vertical MOSFETs may be used, and that heat generated can be dissipated separately from the chip with other integrated circuits and thereby minimize heating of the balance of the electronics.

It will be noted that this example of multiplexing reduces the number of current sources from 512 to only 64. The two FETs 13, 15 in each of these sources are relatively high-current devices (as much as 100 milliamps). Hence, there is a large saving in silicon "real estate" by multiplexing as hereinabove described. In addition, there may be fewer external connections and crossovers. This may result in fewer layers and avoidance of plated through holes on supporting printed circuit boards. The greatest savings come about from the substantial reduction in the number of current drivers. The extent of such savings will of course depend on the number of chips and LEDs multiplexed.

Somewhat different from usual external connections to the LED dice are required for this multiplexing since the anodes of corresponding LEDs on all of the dice need to be connected in parallel for time multiplexing. Parallel connections can be made using a variety of fine line circuit techniques, such as TAB bonding film, fine lines deposited on a ceramic substrate, a ceramic filled epoxy or fiber glass substrate with printed lines, etc., or a fine line metal on glass system with the LEDs inverted for illumination through the glass substrate. In arrangements in which the LEDs are not inverted, conventional wire bonding may be used between metal connection lines on the substrate and LED connection pads as is conventional.

Although but one embodiment of multiplexed current source for an LED print head has been described and illustrated herein, many modifications and variations will be apparent to those skilled in the art. Thus, for example, although FETs are particularly suitable for switching as described herein, equivalent devices may be substituted. For example, although p-channel FETs are used in the drivers, the circuits can be modified to use n-channel FETs, MOSFETs, or bipolar transistors to accomplish the same purposes. Instead of an integrated circuit, discrete components may be used. Either multiple or single transistor transmission gates or tristate logic may be used for applying data from the registers to the data FETs.

Also, switching of a common cathode to ground has been described, and it will be apparent that the cathode may be connected to a bias or other equivalent of ground. Further, some types of LED chips are fabricated with common anodes and these are considered as equivalent, the reference to "cathode" in the description and claims being a matter of convenience. As mentioned above, the numbers of dice multiplexed together, the number n of LEDs per die, and whether the data is multiplexed on the driver IC chip or in the data source, are merely exemplary and may be varied depending on other properties of the printer. It will, therefore, be understood that within the scope of the appended claims the invention may be practiced otherwise than as specifically described.

What is claimed is:

1. A light emitting diode printhead comprising:
    a row of light emitting diode dice, each die comprising a row of light emitting diodes, the die substrate forming a common cathode for the light emitting diodes on that die; and
    a time multiplex driver for a plurality of dice comprising:
        a plurality of current driver FETs connected to a common gate bias voltage;
        a plurality of data FETs, each data FET being in series with a driver FET;
        means for connecting each data FET to the anode of a corresponding light emitting diode on each die, respectively;
        means for applying data to each data FET for applying data for a selected die to the anodes of corresponding light emitting diodes on all the dice; and
        switch means for at the same time selectively connecting the substrate of the selected die to ground.

2. A light emitting diode printhead as recited in claim 1 wherein the means for applying data comprises:
    a shift register divided into a plurality of blocks corresponding to the number of dice, the number of bits in each block corresponding to the number of light emitting diodes on a die; and
    means for applying data in one of the blocks to the corresponding data FETs at the same time the substrate of the selected die is connected to ground for enabling the light emitting diodes on the selected die.

3. A light emitting diode printhead as recited in claim 2 wherein the means for applying data comprises a transmission gate connected to each bit in the shift register, and a parallel input connection to all of the transmission gates of the selected block of the shift register.

4. A light emitting diode printhead as recited in claim 3 further comprising a cathode grounding switch connected between the substrate of each die and ground.

5. A light emitting diode printhead as recited in claim 4 comprising a decoder/counter for sequentially enabling the blocks of transmission gates while at the same time enabling the corresponding cathode grounding switch.

6. A light emitting diode printhead comprising:
a row of light emitting diode dice, each die comprising a row of light emitting diodes, the die substrate forming a common cathode for the light emitting diodes on that die; and
a time multiplex driver for a plurality of dies comprising:
a shift register divided into a plurality of blocks corresponding to the number of dice, the number of bits in each block corresponding to the number of light emitting diodes on a die;
switch means for selectively connecting the substrate of a selected die to ground; and
means for applying data in one of the blocks to the anodes of only corresponding light emitting diodes on all of the dice at the same time the substrate of a selected die is connected to ground for enabling the light emitting diodes on the selected die.

7. A light emitting diode printhead comprising:
a row of light emitting diode dice, each die comprising a row of light emitting diodes, the die substrate forming a common cathode for the light emitting diodes on that die; and
a time multiplex driver for a plurality of dice comprising:
a matrix of a plurality of shift registers corresponding to the number of dice;
a plurality of bits in each register corresponding to the number of light emitting diodes on one die;
means for connecting the first bit in each shift register in parallel to only the first light emitting diode on all of the dice;
means for connecting the second bit in each shift register in parallel to only the second light emitting diode on all of the dice, and so on for each bit in the register and each of the light emitting diodes for applying data for a selected die to the anodes of corresponding light emitting diodes on all the dice; and
switch means for selectively connecting the substrate of a selected die to ground for enabling light emitting diodes on only the selected die.

8. A light emitting diode printhead as recited in claim 7 wherein the means for connecting each bit to the corresponding light emitting diodes comprises a transmission gate connected to each bit in the respective shift register, and a parallel input connection to all of the transmission gates of that shift register.

9. A light emitting diode printhead as recited in claim 8 comprising a decoder/counter having a plurality of sequential outputs, each output forming an input connection to all the transmission gates of a respective shift register.

10. A light emitting diode printhead as recited in claim 8 comprising a cathode grounding switch connected between the substrate of each die and ground.

11. A light emitting diode printhead as recited in claim 10 comprising a decoder/counter for sequentially providing input to the transmission gates of one register while at the same time enabling the corresponding cathode grounding switch.

12. A light emitting diode printhead comprising:
a plurality of light emitting diode enabling current sources, each current source comprising a current driver and a data enable switch in series with the driver;
a row of light emitting diode dice;
a row of light emitting diodes on each die, the die substrate forming a common electrode for the light emitting diodes on the die;
means for connecting each current source in parallel to the other electrode of a plurality of light emitting diodes, one of such light emitting diodes being on each die, respectively;
means for switching the substrate of each die to ground; and
means for applying data signals to each data enable switch and at the same time switching the substrate of only one die to ground for enabling the light emitting diodes on said one die.

13. A light emitting diode printhead as recited in claim 12 wherein the means for applying data signals comprises a plurality of data registers corresponding to the number of light emitting diode dice, each register having as many bits as the number of light emitting diodes on each die, a transmission gate for each bit for connecting the bits in all of the registers to respective data switches, and means for controlling the transmission gates in parallel for each register.

14. A light emitting diode printhead as recited in claim 13 comprising a decoder/counter for enabling the transmission gates for each register in sequence and at the same time switching the substrate of a corresponding die to ground.

15. A light emitting diode printhead as recited in claim 12 wherein the means for applying data signals comprises:
a shift register divided into a plurality of blocks corresponding to the number of dice, the number of bits in each block corresponding to the number of light emitting diodes on a die; and
means for applying data in one of the blocks to the corresponding data enable switches at the same time the substrate of the selected die is connected to ground.

16. A light emitting diode printhead as recited in claim 15 comprising a decoder/counter for sequentially enabling a selected block while at the same time enabling a corresponding cathode grounding switch.

17. A light emitting diode printhead as recited in claim 12 wherein the means for applying data signals comprises a matrix of:
a plurality of shift registers corresponding to the number of dice;
a plurality of bits in each register corresponding to the number of light emitting diodes on one die;
means for connecting the first bit in each shift register in parallel to the first light emitting diode on all of the dice; and
means for connecting the second bit in each shift register in parallel to the second light emitting diode on all of the dice, and so on for each bit in the register and each of the light emitting diodes.

18. A light emitting diode printhead as recited in claim 17 wherein the means for connecting each bit to the corresponding light emitting diodes comprises a transmission gate connected to each bit in the respective shift register, and a parallel input connection to all of the transmission gates of that shift register.

19. A light emitting diode printhead as recited in claim 18 comprising a decoder/counter having a plurality of sequential outputs, each output forming an input connection to all the transmission gates of a respective shift register.

20. A light emitting diode printhead comprising:

a row of light emitting diode dice, each die comprising a row of 1 through n light emitting diodes, the die substrate forming a common cathode of the light emitting diodes;

means for applying a first data signal in parallel to only the first light emitting diode on all of the dice;

means for applying a second data signal in parallel to only the second light emitting diode on all of the dice;

means for applying an nth data signal in parallel to only the nth light emitting diode on all of the dice;

means for making sequential electrical connection to the substrate of each of the dice; and means for providing 1 through n data signals for the light emitting diodes on each die in the same sequence as making the electrical connection to the substrate of the dice for enabling the light emitting diodes on each die in sequence in response to the data signals.

21. A light emitting diode printhead as recited in claim 20 wherein the means for providing data signals comprises:

a matrix of shift registers, the number of registers being the same as the number of dice, each register having n bits;

a transmission gate for each register bit; and means for enabling the transmission gates for all of the bits in a selected register and at the same time making electrical connection to the substrate of a die corresponding to the selected register.

* * * * *